United States Patent
Rothea et al.

(10) Patent No.: US 6,418,384 B1
(45) Date of Patent: Jul. 9, 2002

(54) ACOUSTIC EMISSION MONITOR, METHOD AND MEMORY MEDIA FOR SOLID MATERIAL PROCESSING MACHINERY

(75) Inventors: Remi Rothea, Millery; Etienne Foucher, Paris, both of (FR)

(73) Assignee: Rhodia, Inc., Cranbury, NJ (US)

( * ) Notice: Subject to any disclaimer, the term of this patent is extended or adjusted under 35 U.S.C. 154(b) by 0 days.

(21) Appl. No.: 09/309,870

(22) Filed: May 11, 1999

(51) Int. Cl.$^7$ .................. G06F 19/00; G01D 7/00
(52) U.S. Cl. .................. 702/56; 73/587
(58) Field of Search .............. 702/33–36, 38, 702/39, 56, 113, 150, 182, 183–185, 189–191, 193; 73/660, 593, 587

(56) References Cited

U.S. PATENT DOCUMENTS

| | | | | |
|---|---|---|---|---|
| 3,713,127 A | * | 1/1973 | Keledy et al. ............ 340/540 |
| 4,009,463 A | * | 2/1977 | Vercellotti et al. ......... 367/127 |
| 4,262,538 A | * | 4/1981 | Otawara ................... 73/593 |
| 4,346,914 A | * | 8/1982 | Livers et al. ............... 280/735 |
| 4,377,947 A |   | 3/1983 | Matsushita et al. ......... 73/593 |
| 4,417,478 A | * | 11/1983 | Jon et al. .................. 73/801 |
| 4,453,407 A |   | 6/1984 | Sato et al. ................ 73/462 |
| 4,478,082 A |   | 10/1984 | Sato et al. ................ 73/593 |
| 4,543,830 A | * | 10/1985 | Stephens ................. 73/660 |
| 4,658,245 A | * | 4/1987 | Dye et al. ................. 340/683 |
| 4,669,315 A |   | 6/1987 | Sato et al. ................ 73/660 |
| 4,685,335 A |   | 8/1987 | Santo et al. ............... 73/660 |
| 5,140,858 A | * | 8/1992 | Nishimoto et al. ......... 73/587 |
| 5,176,032 A | * | 1/1993 | Holroyd et al. ............ 73/587 |
| 5,485,752 A | * | 1/1996 | Asano et al. .............. 73/660 |

FOREIGN PATENT DOCUMENTS

| | | | | |
|---|---|---|---|---|
| JP | 407243994 A | * | 9/1995 | .......... G01M/13/04 |

OTHER PUBLICATIONS

"Acoustics—Are We Listening?" by Ron Belchamber, pp. 39–40, 42–43, as appeared in *European Pharmaceutical Review*.

1989 Annual Book of ASTM Standards, vol. 3, pp. xiii, 229–232; 337–345; 270–272, 267–268.

* cited by examiner

Primary Examiner—Marc S. Hoff
Assistant Examiner—Manuel L. Barbee
(74) Attorney, Agent, or Firm—Ohlandt, Greeley, Ruggiero & Perle, L.L.P.

(57) ABSTRACT

Apparatus and method for monitoring acoustic emission signals in machinery that processes solid material such as aspirin to detect rubbing conditions. The apparatus includes an acoustic signal processing system having a computer, an acoustic signal processing program capable of configuring the computer as a filter, and a rubbing signal identifier that configures the computer to set filter conditions for the filter and to detect a rubbing signal. The filter conditions remove some operating noise having a hit rate higher than the operating rate of the rotating part of the machinery by excluding amplitudes less than a front end filter threshold amplitude and durations less than a front end filter duration. The rubbing signals are detected according to the criteria: intensity greater than a predetermined intensity, acoustic emission activity greater than the operating rate of the rotating part and signal length greater than a predetermined signal length.

18 Claims, 2 Drawing Sheets

ACOUSTIC EMISSION MONITOR, METHOD AND MEMORY MEDIA FOR SOLID MATERIAL PROCESSING MACHINERY

BACKGROUND OF INVENTION

Field of Invention

This invention relates to machinery for processing solid material and, in particular, to a monitor for monitoring acoustic emission signals in the machinery to detect rubbing of rotating or vibrating parts contained in the machinery.

Machinery is generally known for processing solid material that is in the form of a powder, crystals, granules, chips, flakes, pellets and the like. For example, machinery used to process aspirin includes a granulator, a sifter and a large and a small screw conveyor. This machinery involves the relative motion of two metallic parts with a narrow clearance in between. One part is usually stationary (for example, a screen, a trough or a casing) and the other has a rotating or vibrating motion (such as a rotor or a screw). Rubbing occurs between the rotating and stationary parts when there are changes in the parts due to use and/or wear.

The granulator breaks compacted aspirin chunks into small granules using oscillating steel blades to force the chunks through a wire screen. The blades are located close enough to the screen to make rubbing or wear contact that produces metallic particles that contaminate the aspirin material.

The sifter is a generally cylindrical container standing on springs and connected to a motor. The container is divided into vertical segments by large screens that are progressively finer mesh from top to bottom, so as aspirin granules enter the sifter from the top and fall through the screens, the granules are sorted by size. When operating the container is shaken by the motor and bounces on the springs in order to agitate the granules. Screen wire may break during agitation and make rubbing contact that produces metallic particles that contaminate the aspirin material.

A screw conveyor is used to provide horizontal transport of aspirin material. The material falls into a U-shaped tube from above and is pushed along the tube by a rotating screw having bearings at either end.

The bearings can wear and result in rubbing contact at the bearings as well as between the screw and the U-shaped tube. The latter rubbing contact produces metallic particles that contaminate the aspirin material.

Magnetic traps have been used to capture the metallic particles. However, these traps are unable to assure a 100% metal free product due to very fine and/or poorly magnetic particles and are further unable to determine what machine or part of a machine is causing the contamination.

Devices are known that detect sound or acoustic emission signals developed in machinery having rotating or vibrating parts. Acoustic emission signals are elastic waves or stress waves emitted in or at the surface of a material with frequencies in the ultrasonic domain, typically 20 kilo Hertz (KHz) to 2 mega Hertz(MHz). Acoustic emission signals are short transients (durations from about 100 microseconds ($\mu s$) to 100 milliseconds (ms)) usually emitted in large numbers (few hundreds to few millions). For instance, most acoustic emission instruments are able to acquire over 1,000 signals per second that correspond to sudden releases of energy from rubbing or any other cause.

A device that uses acoustic emission signals to detect rubbing locations in machinery having rotating parts is described in U. S. Pat. No. 4,377,947. This device employs two spaced apart sensors, a pulse generator that generates a pulse for each rotation of the rotating part and a circuit for identifying a rubbing location on the basis of the travel time difference of acoustic emission signals arriving at the two sensors. This device does not have any filter to remove noise from the sensed acoustic emission signals.

A device that uses acoustic emission signals to detect cracks in machinery having a rotating body is described in U.S. Pat. No. 4,685,335. The device employs two pairs of sensors arranged on the machinery for detecting acoustic signals. The device includes means to remove noise of certain types from the sensed acoustic emission signals. Thus, noise due to rubbing and due to metal wiping is recognized and removed from the sensed acoustic emission signals. The device is not used for processing solid material and, therefore, does not remove noise that affects recognition of rubbing in a solid material processing environment.

Accordingly, there is a need to recognize and locate rubbing in solid material processing machines.

A main object of the present invention is to provide an apparatus that identifies rubbing signals in acoustic emission signals produced in a solid material processing machine.

Another object of the present invention is to provide an apparatus that identifies rubbing signals in a large number of acoustic emission signals produced in a solid material processing machine.

Yet another object of the present invention is to provide a method that identifies rubbing signals in a large number of acoustic emission signals produced in a solid material processing machine.

A further object of the present invention is to provide an apparatus that filters from acoustic emission signals operating noise that affects recognition of rubbing signals.

A still further object of the present invention is to provide a memory media for controlling a computer system to identify rubbing signals in acoustic emission signals produced in a solid material processing machine.

BRIEF SUMMARY OF INVENTION

In accordance with the present invention, apparatus is provided to identify rubbing signals in acoustic emission signals that are produced in a machine that processes solid material. The apparatus includes a filter for filtering operating noise of the machine from the acoustic emission signals to produce filtered signals. The operating noise filtered out includes signals that have an acoustic emission activity (or recurrence rate) greater than the operating rate of the rotating or vibrating part of the machine, an acoustic emission amplitude less than a front end filter threshold amplitude and a signal duration less than a front end filter threshold signal duration. A discriminator detects rubbing signals from the filtered signals according to the following characteristics: acoustic emission intensity greater than a predetermined intensity, acoustic emission activity greater than the machinery operating rate and acoustic emission signal length greater than a predetermined length. Signaling means responds to the detected rubbing signals to signal occurrence of rubbing.

In a specific embodiment of the present invention, the front end filter threshold amplitude is in the range of about 40 to 55 decibels AE and the front end filter threshold signal duration is about 1 to 10 ms.

According to one embodiment of the present invention, the filter, discriminator and signaling means are configured in a computer by an acoustic emission signal program and a rubbing signal program. The rubbing signal program configures the computer as a means to establish the operating noise filter conditions for the filter. The filter conditions are first set for the machine running unloaded and then adjusted for the machine running solid material in a well maintained and non-rubbing condition.

In alternate embodiments, the discriminator detects the rubbing signal intensity from at least one of the group that includes: peak amplitude, RMS voltage, relative energy and true energy. The signal length is detected from at least one of the group that includes: duration, rise time, counts to peak, event counts and average frequency.

A memory media according to the present invention controls a computer to identify rubbing signals, wherein the computer is configured to perform filter operations on acoustic emission signals. The memory media includes:

(a) means for configuring said computer system to set filter conditions for filtering operating noise from the acoustic emission signals to form the filtered signals, the filtered out operating noise including signals that have an acoustic emission activity greater than said operating rate, an amplitude less than a front end filter threshold amplitude and a signal duration less than a front end filter threshold duration;

(b) means for configuring the computer system to detect the rubbing signals from the filtered signals, the rubbing signals including the following characteristics: acoustic emission intensity greater than a predetermined intensity, acoustic emission activity greater than the operating rate and acoustic emission signal length greater than a predetermined length; and (c) means for configuring the computer system to signal detection of the rubbing signals.

According to a more specific embodiment the memory media of the present invention, means (a) is operable to first set the filter conditions for the machine running unloaded and then to adjust the set filter conditions for the machine running solid material in a well maintained and non-rubbing condition.

The method according to the invention includes:

producing electrical signals proportional to acoustic signals;

filtering operating noise from the electrical signals to provide filtered signals, the operating noise filtered out including signals that have an acoustic emission activity greater than the operating rate, an amplitude less than a front end filter threshold amplitude and a signal duration less than a front end filter threshold signal duration;

detecting the rubbing signals from the filtered signals, the rubbing signals having the following characteristics: acoustic emission intensity greater than a predetermined intensity, acoustic emission activity greater than the operating rate and acoustic emission signal length greater than a predetermined length; and signaling the occurrence of detected rubbing signals.

In a more specific embodiment, the method according to the present invention further includes setting filter conditions for the filtering step by first setting the filter conditions for the machine running unloaded and then adjusting the set filter conditions for the machine running solid material in a well maintained and non-rubbing condition.

In a specific embodiment of the method according to the present invention, the front end filter threshold amplitude is in the range of about 40 to 55 decibels AE and the front end filter threshold signal duration is about 1 to 10 ms.

In alternate embodiments of the method according to the present invention, the rubbing signal intensity is detected from at least one of the group that includes: peak amplitude, RMS voltage, relative energy and true energy. The acoustic emission signal length is detected from at least one of the group that includes: duration, rise time, counts to peak, event counts and average frequency.

BRIEF DESCRIPTION OF DRAWINGS

Other and further objects, advantages and features of the present invention will be understood by reference to the following specification in conjunction with the accompanying drawings, in which like reference characters denote like elements of structure and.

DESCRIPTION OF THE INVENTION

Figure 1:
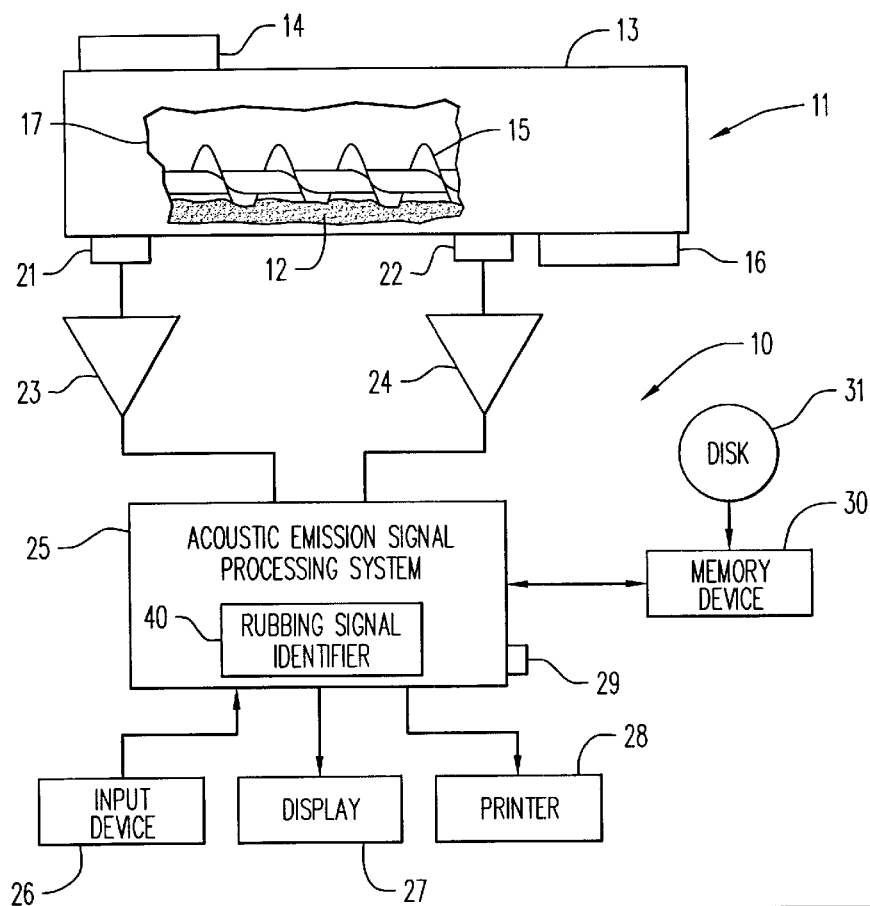
FIG. 1 is a block diagram of an apparatus that identifies rubbing conditions in a solid material processing machine according to the present invention.

With reference to FIG. 1, there is provided an apparatus for identifying a rubbing condition according to the present invention, generally represented by numeral 10. Apparatus 10 is arranged to monitor rubbing conditions that occur in a solid material processing machine 11.

Machine 11 may be one of several machines employed in a solid material processing facility. By way of example, machine 11 is described herein as a screw conveyor used in an aspirin processing facility for transporting aspirin material. Screw conveyor 11 has a U-shaped tube (or trough) 13 and a screw 15 shown in a cut away portion 17 of U-shaped tube 13. Screw 15 is rotatably driven by a motor (not shown) to horizontally transport an aspirin material 12. Aspirin material 12 enters U-shaped tube 13 via an entry chute 14 and is pushed along tube 13 by screw 15 to an exit chute 16.

Rubbing conditions can develop between rotating screw 15 and U-shaped tube 13 due to changes in tube 13 and/or misalignment with screw 15. For example, workers may hit tube 13 with hammers to assist transport of the aspirin material 12 resulting in dents to the tube or in shifts of alignment of tube 13 with screw 15. Also, screw 15 is journaled in bearings (not shown) at either end of tube 13. Wear of these bearings, under product load and after a significant service time, can affect the rotation of the screw and alignment with tube 13. Rubbing contact between screw 15 and tube 13 produces metallic particles that contaminate aspirin material 12.

Apparatus 10 includes a plurality of sensors 21 and 22 disposed at spaced apart locations along the length of tube 13. Although only two sensors are shown, it will be appreciated that more sensors may be deployed, particularly for long screw conveyors. The number and location of sensors should ensure a 100% coverage of the possible wear or rubbing areas. The number depends on ultrasound attenuation in the metal and geometry of tube 13, as well as sensor type (frequency, sensitivity) and coupling. Sensors 21 and 22 may suitably be any transducer that senses acoustic emission signals produced in screw conveyor 11 during its operation. Preferably, sensors 21 and 22 are of the piezoelectric type, such as WDI sensors, available from Physical Acoustics Corporation of Princeton, N.J. Sensors 21 and 22 are mounted to the surface of tube 13 by means of any suitable ultrasonic couplant, for example hot glue.

Sensors 21 and 22 are operative to sense acoustic emission signals produced in screw conveyor 11 at their respective locations to produce at their outputs electrical signals that are proportional to the sensed acoustic emission signals. The acoustic emission signals sensed by sensors 21 and 22 are referred to herein as the channel 1 and channel 2 acoustic emission signals, respectively. The channel 1 acoustic emission signals are amplified by a pre-amplifier 23 and the channel 2 acoustic emission signals are amplified by a pre-amplifier 24. When a WDI sensor is used, the sensor and associated pre-amplifier are contained in a single package.

It will be appreciated that other machines (granulators, sifters and the like) that are involved in processing aspirin material 12 may also be monitored by apparatus 10 on separate channels (not shown) or by a separate apparatus for identification of rubbing conditions.

The amplified electrical acoustic emission signals are applied to an acoustic emission signal processing system 25. Acoustic emission signal processing system 25 can be any system, analog or digital and preferably digital, capable of performing acoustic emission signal acquisition, acoustic emission signal feature extraction and data processing. System 25 needs the ability to properly record acoustic emission signals from wear at a sampling rate of 2 MHz or higher, preferably about 4 MHz, if digital, but in any case wide band acquisition (at least 1 KHz to 1 MHz), peak definition time (PDT), hit definition time (HDT) and hit lockout time (HLT) adjustments. It should be able to measure any signal above a given threshold and, if necessary, apply a front end filter on any acoustic emission signal feature or combination of features. In one design embodying the present invention, acoustic emission signal processing system 25 is a personal computer equipped with an AEDSP-32/16 PC board and MISTRAS software available from Physical Acoustics Corp.

Acoustic emission signal processing system 25 is configured with an input device 26, a display 27, a printer 28, a memory device 30 and a rubbing signal identifier 40. Input device 26 may suitably be a keyboard and/or a mouse. Display 27 may be any computer display that is capable of displaying data in alphanumeric and/or graphical form. Memory device 30 may suitably be any memory device capable of providing data or software to acoustic emission signal processing system 25. For example, memory device 30 may be a memory drive with a memory media such as a disc 31 upon which data can be recorded and/or read. Output port 29 is a standard computer output port. Printer 28 may be any standard computer printer.

Rubbing signal identifier 40 may be configured in acoustic emission signal processing system 25 in hardwired form on a PC board or preferably in software form. If in software form, rubbing signal identifier 40 may be stored on memory disc 31 that is inserted into memory device 30. The software is either accessed from memory device 30 or loaded into the memory of acoustic emission signal processing system 25.

Figure 2:
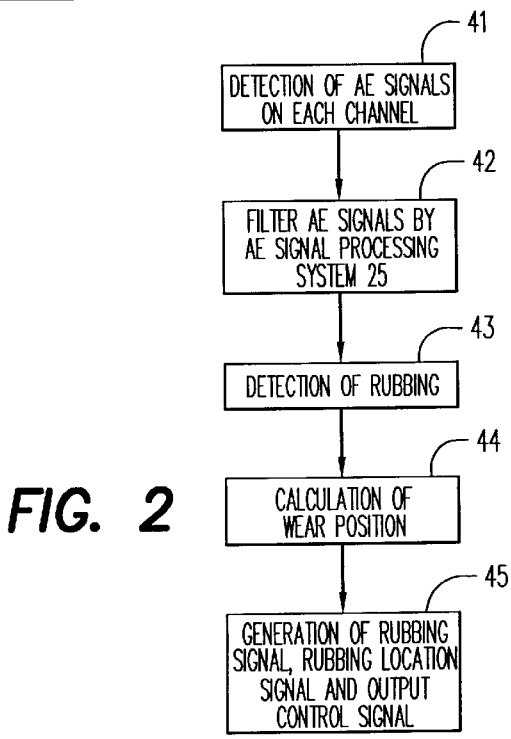
FIG. 2 is a process flow diagram for the apparatus of FIG. 1.

Referring to FIG. 2, a process flow for acoustic monitor 10 of the present includes:
  detecting the acoustic emission signals on each channel by sensors 21 and 22 at box 41;
  filtering acoustic emission signals with acoustic emission signal processing system 25 configured as a filter by the aforementioned PC board and MISTRAS software at box 42;
  detecting rubbing with the rubbing signal identifier 40 at box 43;
  calculating the position of the wear or rubbing at box 44; and
  generating a rubbing condition signal and a rubbing location signal at box 45.

From a set of signal features available in conventional acoustic signal processors, the inventors have determined a number of features or characteristics of rubbing signals that are distinguishable from operating noise of solid material processing machinery 11. These features include:
  Peak amplitude greater than a predetermined amplitude that may be expressed in dB AE, where 0 dB AE=1 micro volt (mV) at the sensor which is the reference amplitude $A_0$, and dB AE=20 log $(A/A_0)$ with A=peak amplitude of the acoustic emission signal in mV.
  RMS voltage, meaning the root means square of an acoustic signal over a time period. If the time period is shorter or about equal to the signal duration, it is used as an amplitude signal feature. If longer, it is used as a continuous emission level or activity characteristic.
  Duration greater than a predetermined duration, where duration is the time that the signal is above the threshold.
  Rise time, meaning the time from the first threshold crossing to peak amplitude.
  Counts, meaning the total number of oscillations or threshold crossing pulses during the signal duration.
  Counts to peak, meaning the number of threshold crossings during signal rise time.
  Signal strength (also known as MARSE, PAC energy, relative energy or energy counts), meaning the Measured Area under the Rectified Signal Envelope (MARSE).
  True energy, meaning the measured area under the squared signal envelope.
  Average frequency, meaning event counts divided by the signal duration.
  Good cluster location, meaning a concentration of events located in the same area, where rubbing is likely to occur, for example on a linear location histogram between two sensors.
  Acoustic emission activity, meaning a characteristic measured by hit or event rate (number of signals per unit of time), energy rate (sum of acoustic emission signal energy per unit of time) and the like.
  Acoustic emission intensity or magnitude, meaning one of the following features: amplitude, relative energy, true energy and RMS voltage. These features, though not identical, are related and therefore exhibit the same evolution.
  Acoustic signal length, meaning one of the following features: duration, event counts, rise time, counts to peak and average frequency. These features, though not identical, are related and therefore exhibit the same evolution.

Figure 3:
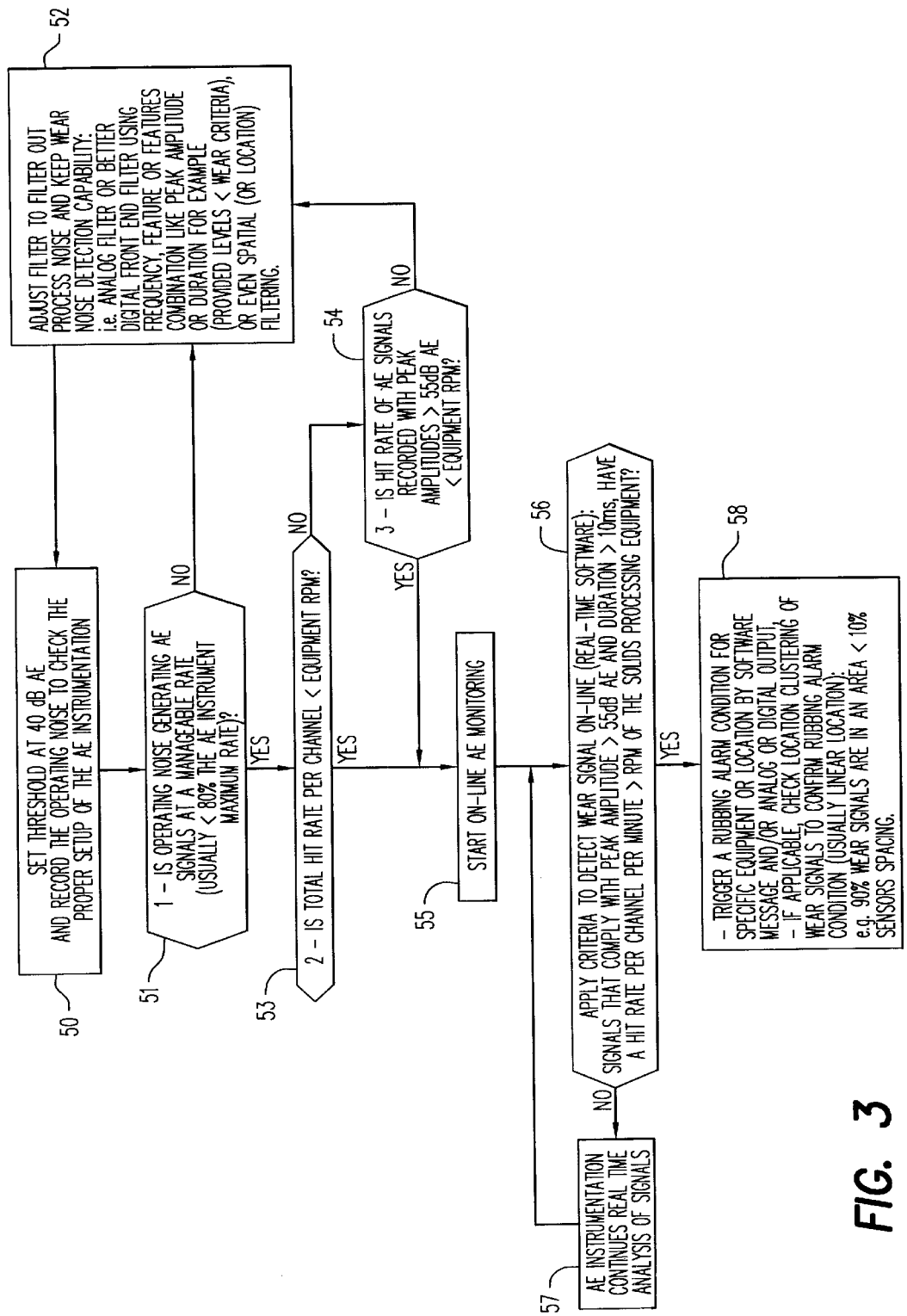
FIG. 3 is a more detailed flow diagram for the apparatus of FIG. 1.

With reference to FIG. 3, rubbing identifier 40 includes means to set the filter conditions of filter 42 (or boxes 51 through 54) and means to detect rubbing at box 43 (or boxes 55 through 57) and means to signal a rubbing signal alarm condition at box 45 (or box 58). The operating noise filter conditions are established and set into acoustic emission signal processing system 25 during two runs of solid material processing machinery 11. In the first run, machinery 11 is run in an empty condition without any solid material 12. In the second run, machinery 11 is run with solid material 12, but in a well maintained condition without any rubbing.

The setting of operating noise filter conditions starts at box 50 where a threshold for the acoustic emission signals is set to establish a baseline for measuring most acoustic emission signal features like rise time, duration, counts, and energy. In one design embodying the invention the baseline threshold is set at 40 decibels (dB) AE and is held constant. Also at box 50, the operating noise is recorded for a check as to whether the monitor 10 is properly set up, that is, fully operational with 100% coverage of rubbing or wear areas. If not, sensors installation (sensitivity, coupling and location), system connections and software are checked and the process begins again at box 50. If so, control then passes to box 51.

At box 51 rubbing signal identifier 40 checks the acoustic emission activity to determine whether the throughput of acoustic emission signal processing system 25 is adequate to process the acoustic emission signals. Thus, if the rate is equal to or greater than 80% of the maximum rate that system 25 can process signals, control passes to box 52 for an adjustment of the filter conditions.

At box 52, the user adjusts the filter conditions by operating input devices 26. Operating noise filter conditions that can be adjusted include frequency, features, such as peak amplitude and/or signal duration, and location filtering that can remove process noise, but keep wear condition signals. For example, typical engine and process noise is low amplitude and duration, so front end filtering on these features will not affect the ability to detect a rubbing signal, provided the filter levels are kept below the rubbing signal criteria described below.

A filter condition that could be adjusted at this point is to increase the front end filter threshold from 40 dB to 45 dB. This will filter out peak amplitudes below 45 dB, and will not affect the measure of features that are referenced to the baseline threshold.

Acoustic emission signal processing system 25 responds to user input of the filter adjustment to change the front end filter from 40 to 45 dB. Then rubbing signal identifier 40 again compares the acoustic emission signal rate with the throughput of acoustic emission signal processing system 25. If the acoustic emission signal rate is still not manageable, the filter conditions are adjusted again at box 52. If the acoustic emission signal rate is manageable, control passes to box 53.

At box 53, rubbing signal identifier 40 compares the acoustic emission activity in terms of hit rate per channel per minute to the rotating rate in revolutions per minute (rpm) of machinery 11. If the hit rate is greater than the rotating rate, control passes to box 54.

At box 54, rubbing signal identifier 40 compares only those acoustic emission signals with peak amplitude greater than 55 dB with the rpm of machinery 11. If the hit rate is greater, control passes to box 52 for a filter condition adjustment.

Filter 42 needs to be adjusted to reduce the hit rate. One change that can be made is to filter out all signals of short duration, below 2 or 3 ms. This will remove noise associated with bearings and/or the engine. After adjustment, rubbing signal identifier again cycles through the operations of boxes 50 through 53 and/or 54. If the hit rate comparison at box 53 or 54 is less than the rpm of machinery 11, the filter conditions for the unloaded run are completed. The above process is then repeated for a loaded run of machinery 11. Acoustic emission signal processing system 25 is ready to monitor machinery 11 as it processes solid material 12.

When machinery 11 is processing solid material 12, rubbing signal identifier 40 starts on line monitoring at box 55. At box 56, the computer is configured as a discriminator to detect rubbing signals by applying one or more rubbing signal criteria selected from the aforementioned criteria. Generally, discriminator 56 applies as criteria: acoustic emission intensity greater than a predetermined intensity, activity greater than the operating rate of the rotating part of machinery 11 and signal length greater than a predetermined length. The intensity characteristic can be detected from the group that includes: peak amplitude, RMS voltage, energy and signal strength. The signal length characteristic can be selected from the group that includes: duration, rise time, counts to peak, event counts and average frequency. The activity can be selected from the group that includes hit or event rate, count rate or energy rate.

Preferably, the criteria applied at box 56 are:

Peak amplitude>55 dB AE, and

Duration>10 ms, and

Channel Hit rate per minute>rpm of machinery 11.

Box 57 serves to continue the on line monitoring of the acoustic emission signal in real time. When the rubbing signal criteria are satisfied at box 56, a rubbing signal indicative of a rubbing condition has been detected. Control passes to box 58 where the rubbing signal can be confirmed by location clustering. That is, a histogram is generated for hits per linear location between sensors 21 and 22. If confirmed, the detection of rubbing signals is signaled as in a message presented on display device 27 or in an alarm device (not shown) via output port 29.

Corrective action can then be initiated to repair machinery 11 to remove the rubbing condition.

The method according to the present invention involves the steps of:

producing electrical signals at the outputs of sensors 21 and 22 proportional to the acoustic signals;

filtering operating noise (by operation of filter 42) from the electrical signals to provide filtered signals, the operating noise filtered out including signals that have an activity greater than the operating rate, an amplitude less than a front end filter threshold amplitude and a signal duration less than a front end filter threshold signal duration;

detecting (by operation of discriminator 56) the rubbing signals from the filtered signals, the rubbing signals having the following characteristics: intensity greater than a predetermined intensity, activity greater than the operating rate and signal length greater than the predetermined length; and signaling by operation of display 27 or output port 29 the occurrence of detected rubbing signals.

The method according to the present invention further includes setting filter conditions for the filtering step by first setting the filter conditions for the machine running unloaded and then adjusting the set filter conditions for the machine running solid material in a well maintained and non-rubbing condition.

In a specific embodiment of the method according to the present invention, the front end filter threshold amplitude is in the range of about 40 to 55 decibels AE and the front end filter signal duration is about 1 to 10 ms.

In alternate embodiments of the method according to the present invention, the rubbing signal intensity is detected from at least one of the group that includes: peak amplitude, RMS voltage, energy and signal strength. The signal length is detected from at least one of the group that includes: duration, rise time, counts to peak, event counts and average frequency.

A memory media according to the present invention controls the computer of acoustic emission processing system 25 to identify rubbing signals, wherein the computer is configured to perform filter operations on acoustic emission signals. The memory media includes:

(a) means for configuring the computer system to set filter conditions for the filter operations, the filter conditions filtering out operating noise, the operating noise filtered out including signals that have an activity greater than the operating rate, an amplitude less than a front end filter threshold amplitude and a signal duration less than a front end filter threshold signal duration;

(b) means for configuring the computer system to detect the rubbing signals from the filtered signals, the rubbing signals having the following characteristics: intensity greater than a predetermined intensity, activity greater than the operating rate and signal length greater than the predetermined length; and (c) means for configuring the computer system to signal detection of the rubbing signals.

According to a more specific embodiment the memory media of the present invention, means (a) is operable to first set the filter conditions for the machine running unloaded and then to adjust the set filter conditions for the machine running solid material in a well maintained and non-rubbing condition.

The present invention having been thus described with particular reference to the preferred forms thereof, it will be obvious that various changes and modifications may be made therein without departing from the spirit and scope of the present invention as defined in the appended claims.

What is claimed is:

1. Apparatus for identifying rubbing signals in acoustic emission signals that are produced in a machine that processes solid material, said machine including a stationary part and a part that rotates or vibrates at an operating rate, said rubbing signals occurring due to rubbing between said rotating part and said stationary part, said apparatus comprising:

a sensor coupled to said machine for producing electrical signals proportional to said acoustic emission signals;

filter means for filtering operating noise from said electrical signals to provide filtered signals, said operating noise filtered out including signals that have an acoustic emission activity greater than said operating rate, an amplitude less than a front end filter threshold amplitude and a duration less than a front end filter threshold duration;

discrimination means for detecting said rubbing signals from said filtered signals, said rubbing signals including the following characteristics: acoustic emission intensity greater than a predetermined intensity, acoustic emission activity greater than said operating rate and an acoustic emission signal length greater than a predetermined length; and signaling means responsive to said detected rubbing signals to signal occurrence of rubbing, wherein said front end filter threshold amplitude is in the range of 40 to 55 decibels AE.

2. The apparatus according to claim 1, wherein said predetermined intensity corresponds to a peak amplitude of 55 decibels or more.

3. The apparatus according to claim 2, wherein said predetermined length is 10 milliseconds or more.

4. The apparatus according to claim 3, wherein said front end filter threshold duration is in the range of 1 to 10 milliseconds.

5. The apparatus according to claim 4, said apparatus further comprising a computer; and wherein said filter means, said discrimination means and said signaling means are configured in said computer by an acoustic emission signal program and a rubbing signal identifier program.

6. The apparatus as set forth in claim 5, wherein said rubbing signal identifier program configures said computer for establishing said filter conditions.

7. The apparatus according to claim 6, wherein said means for establishing filter conditions is operable to first set said filter conditions for said machine running unloaded and then adjusting said set filter conditions for said machine running solid material in a well maintained and non-rubbing condition.

8. Apparatus for identifying rubbing signals in acoustic emission signals that are produced in a machine that processes solid material, said machine including a stationary part and a part that rotates or vibrates at an operating rate, said rubbing signals occurring due to rubbing between said rotating part and said stationary part, said apparatus comprising:

a sensor coupled to said machine for producing electrical signals proportional to said acoustic emission signals;

filter means for filtering operating noise from said electrical signals to provide filtered signals, said operating noise filtered out including signals that have an acoustic emission activity greater than said operating rate, an amplitude less than a front end filter threshold amplitude and a duration less than a front end filter threshold duration;

discrimination means for detecting said rubbing signals from said filtered signals, said rubbing signals including the following characteristics: acoustic emission intensity greater than a predetermined intensity, acoustic emission activity greater than said operating rate and an acoustic emission signal length greater than a predetermined length; and signaling means responsive to said detected rubbing signals to signal occurrence of rubbing, wherein said predetermined intensity corresponds to a peak amplitude of 55 decibels or more.

9. The apparatus according to claim 8, wherein said predetermined length is 10 milliseconds or more.

10. A method of identifying rubbing signals in acoustic emission signals that are produced in a machine that processes solid material, said machine including a stationary part and a part that rotates or vibrates at an operating rate, said rubbing signals occurring due to rubbing between said rotating part and said stationary part, said method comprising:

producing electrical signals proportional to said acoustic signals;

filtering operating noise from said electrical signals to provide filtered signals, said operating noise filtered out including signals that have an acoustic emission activity greater than said operating rate, an amplitude less than a front end filter threshold amplitude and a duration less than a front end filter threshold duration;

detecting said rubbing signals from said filtered signals, said rubbing signals having the following characteristics: acoustic emission intensity greater than a predetermined intensity, acoustic emission activity greater than said operating rate and an acoustic emission signal length greater than a predetermined length;

setting filter conditions for said filtering step by first setting said filter conditions for said machine running unloaded and then adjusting said set filter conditions for said machine running solid material in a well maintained and non-rubbing condition, wherein said front end filter threshold amplitude is in the range of 40 to 55 decibels AE; and signaling the occurrence of detected rubbing signals.

11. The method according to claim 10 wherein said predetermined intensity corresponds to a peak amplitude of 55 decibels AE or more.

12. The method according to claim 11 wherein said predetermined length is 10 milliseconds or more.

13. The method according to claim 12, wherein said front end filter threshold duration is in the range of 1 to 10 milliseconds.

14. A memory media for controlling a computer system to identify rubbing signals in acoustic emission signals that are produced in a machine that processes solid material, said machine including a stationary part and a part that rotates or vibrates at an operating rate, said rubbing signals occurring due to rubbing between said rotating part and said stationary part, said computer system being configured to perform filter operations on said acoustic emission signals to provide filtered signals, said memory media comprising:

(a) means for configuring said computer system to set filter conditions for filtering operating noise from said acoustic emission signals to form said filtered signals, said operating noise filtered out including signals that have an acoustic emission activity greater than said operating rate, an amplitude less than a front end filter threshold amplitude and a duration less than a front end filter threshold duration (b) means for configuring said computer system to detect said rubbing signals from said filtered signals, said rubbing signals having the following characteristics: acoustic emission intensity greater than a predetermined intensity, acoustic emission activity greater than said operating rate and acoustic emission signal length greater than a predetermined length; and (c) means for configuring said computer system to signal detection of said rubbing, wherein said front end filter threshold amplitude is in the range of 40 to 55 decibels AE.

15. A memory media for controlling a computer system to identify rubbing signals in acoustic emission signals that are produced in a machine that processes solid material, said machine including a stationary part and a part that rotates or vibrates at an operating rate, said rubbing signals occurring due to rubbing between said rotating part and said stationary part, said computer system being configured to perform filter operations on said acoustic emission signals to provide filtered signals, said memory media comprising:

(a) means for configuring said computer system to set filter conditions for filtering operating noise from said acoustic emission signals to form said filtered signals, said operating noise filtered out including signals that have an acoustic emission activity greater than said operating rate, an amplitude less than a front end filter threshold amplitude and a duration less than a front end filter threshold duration (b) means for configuring said computer system to detect said. rubbing signals from said filtered signals, said rubbing signals having the following characteristics: acoustic emission intensity greater than a predetermined intensity, acoustic emission activity greater than said operating rate and acoustic emission signal length greater than a predetermined length; and (c) means for configuring said computer system to signal detection of said rubbing, wherein said front end filter threshold duration is in the range of 1 to 10 milliseconds.

16. Apparatus for identifying rubbing signals in acoustic emission signals that are produced in a machine that processes solid material, said machine including a stationary part and a part that rotates or vibrates at an operating rate, said rubbing signals occurring due to rubbing between said rotating part and said stationary part, said apparatus comprising:

a sensor coupled to said machine for producing electrical signals proportional to said acoustic emission signals;

filter means for filtering operating noise from said electrical signals to provide filtered signals, said operating noise filtered out including signals that have an acoustic emission activity greater than said operating rate, an amplitude less than a front end filter threshold amplitude and a duration less than a front end filter threshold duration;

discrimination means for detecting said rubbing signals from said filtered signals, said rubbing signals including the following characteristics: acoustic emission intensity greater than a predetermined intensity, acoustic emission activity greater than said operating rate and an acoustic emission signal length greater than a predetermined length; and signaling means responsive to said detected rubbing signals to signal occurrence of rubbing, wherein said predetermined length is 10 milliseconds or more.

17. Apparatus for identifying rubbing signals in acoustic emission signals that are produced in a machine that processes solid material, said machine including a stationary part and a part that rotates or vibrates at an operating rate, said rubbing signals occurring due to rubbing between said rotating part and said stationary part, said apparatus comprising:

a sensor coupled to said machine for producing electrical signals proportional to said acoustic emission signals;

filter means for filtering operating noise from said electrical signals to provide filtered signals, said operating noise filtered out including signals that have an acoustic emission activity greater than said operating rate, an amplitude less than a front end filter threshold amplitude and a duration less than a front end filter threshold duration;

discrimination means for detecting said rubbing signals from said filtered signals, said rubbing signals including the following characteristics: acoustic emission intensity greater than a predetermined intensity, acoustic emission activity greater than said operating rate and an acoustic emission signal length greater than a predetermined length; and signaling means responsive to said detected rubbing signals to signal occurrence of rubbing, wherein said front end filter threshold duration is in the range of 1 to 10 milliseconds.

18. A method of identifying rubbing signals in acoustic emission signals that are produced in a machine that processes solid material, said machine including a stationary part and a part that rotates or vibrates at an operating rate, said rubbing signals occurring due to rubbing between said rotating part and said stationary part, said method comprising:

producing electrical signals proportional to said acoustic signals;

filtering operating noise from said electrical signals to provide filtered signals, said operating noise filtered out including signals that have an acoustic emission activity greater than said operating rate, an amplitude less than a front end filter threshold amplitude and a duration less than a front end filter threshold duration;

detecting said rubbing signals from said filtered signals, said rubbing signals having the following characteristics: acoustic emission intensity greater than a predetermined intensity, acoustic emission activity greater than said operating rate and an acoustic emission signal length greater than a predetermined length; and signaling the occurrence of detected rubbing signals, wherein said front end filter threshold amplitude is in the range of 40 to 55 decibels AE.

* * * * *